March 1, 1949.　　　F. D. WILSON ET AL　　　2,462,926
FULL CIRCLE BOOM CRANE
Filed March 27, 1944　　　　　　　　　　10 Sheets-Sheet 1
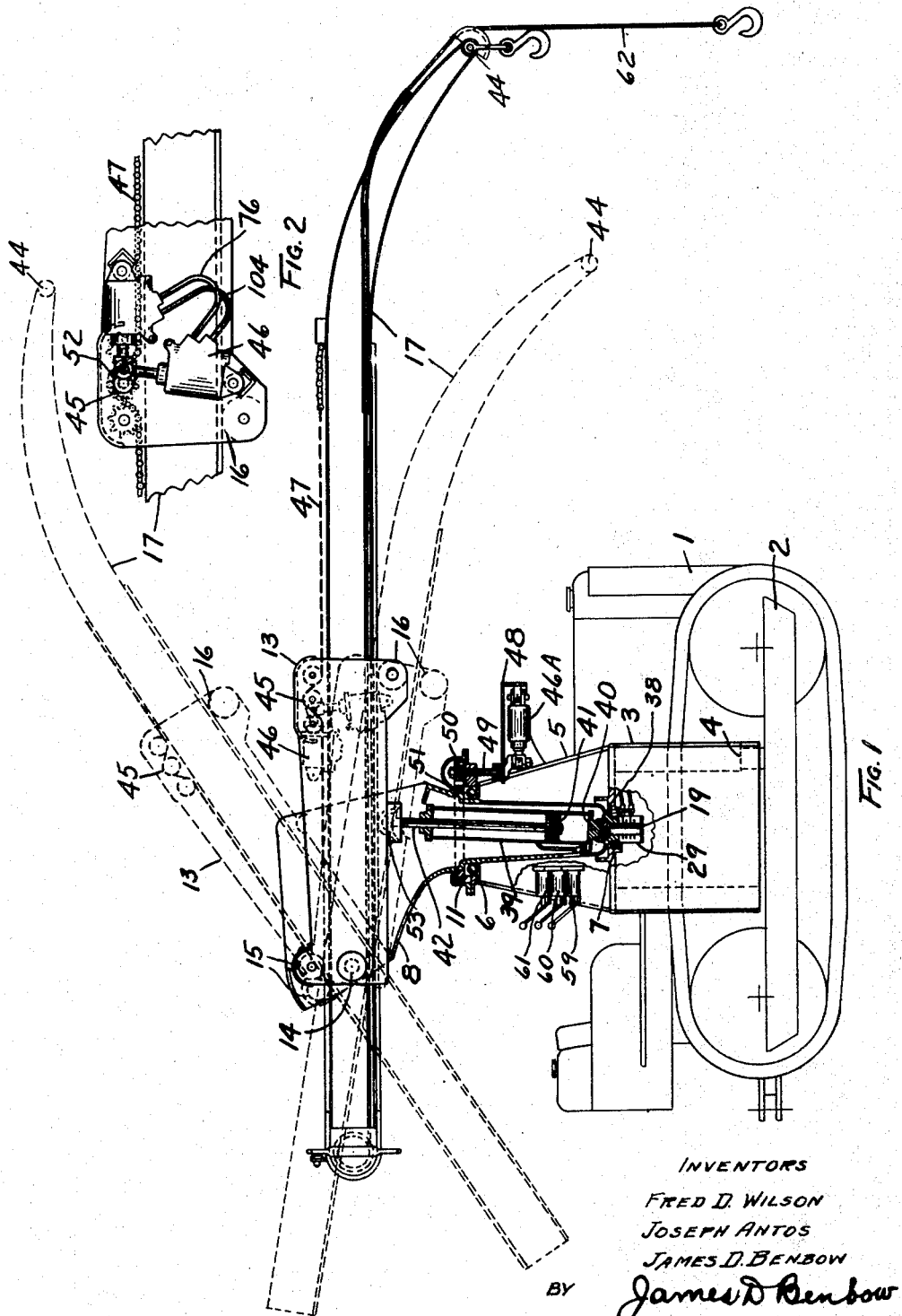
INVENTORS
FRED D. WILSON
JOSEPH ANTOS
JAMES D. BENBOW
BY James D. Benbow
ATTORNEY

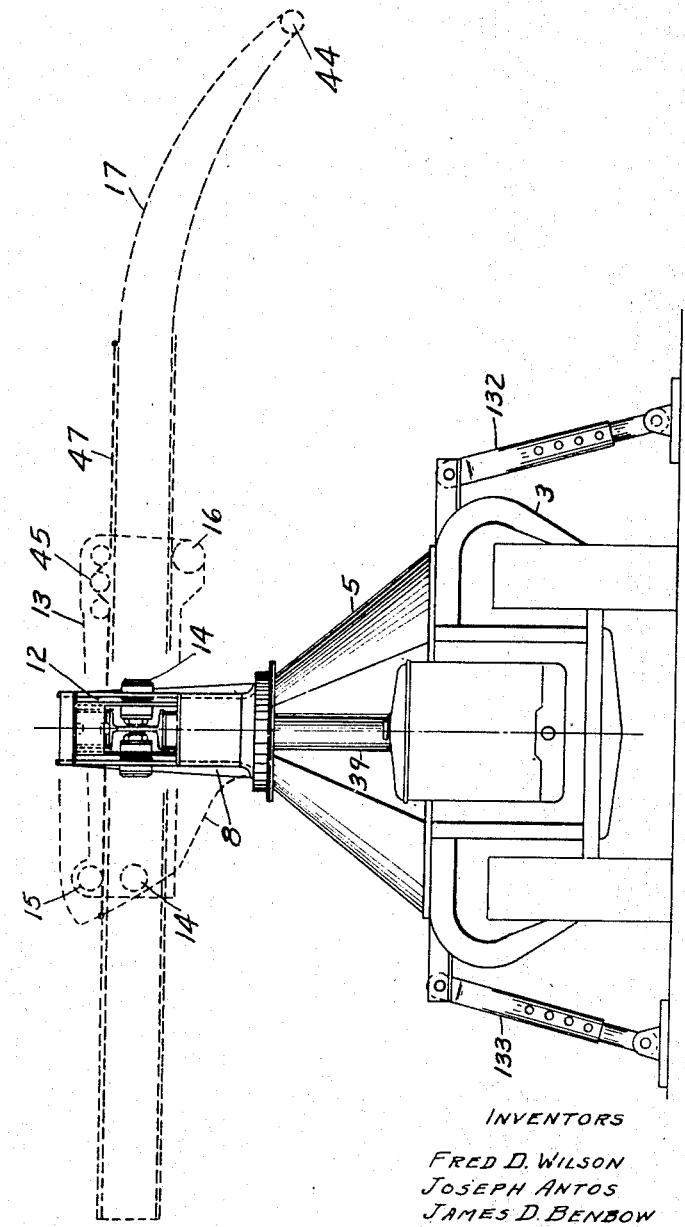

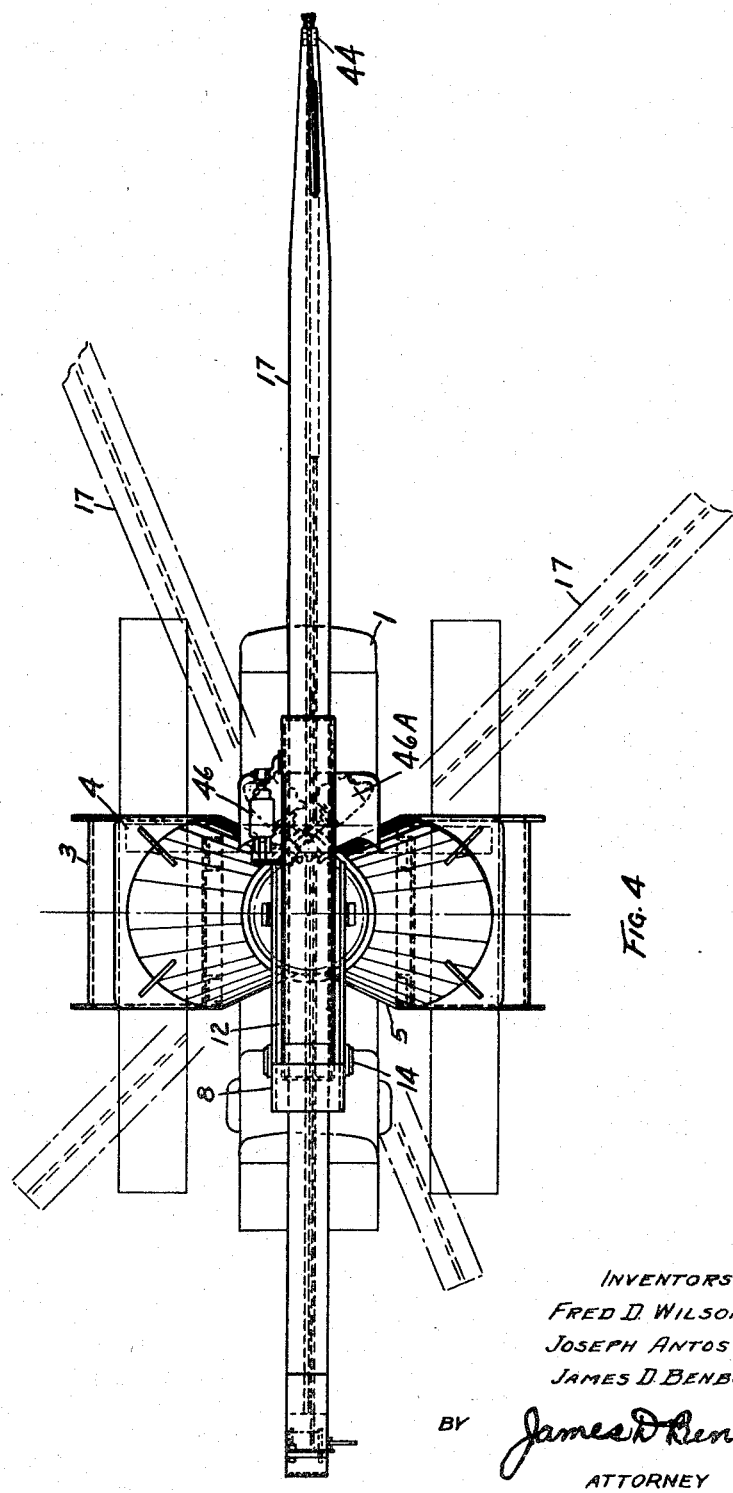

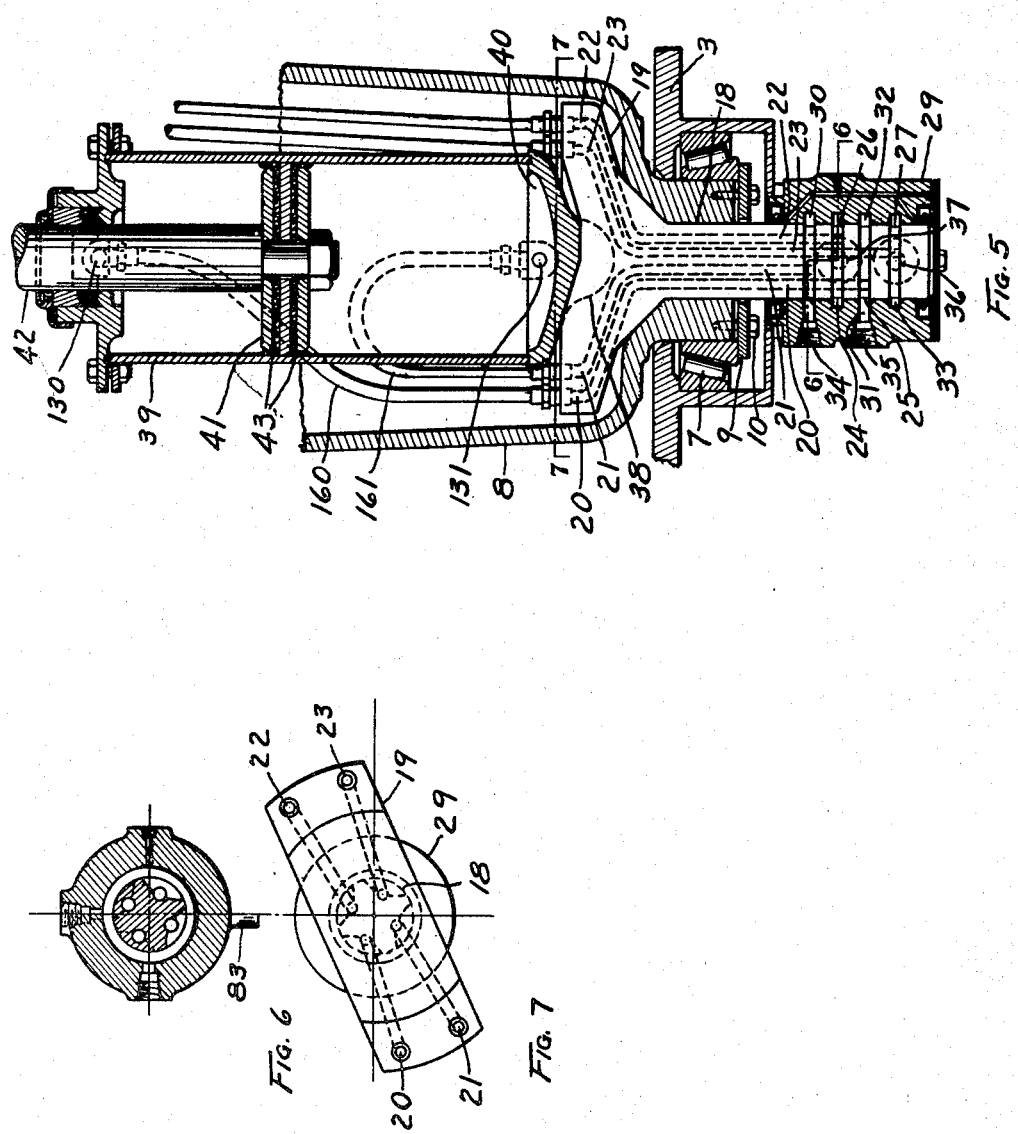

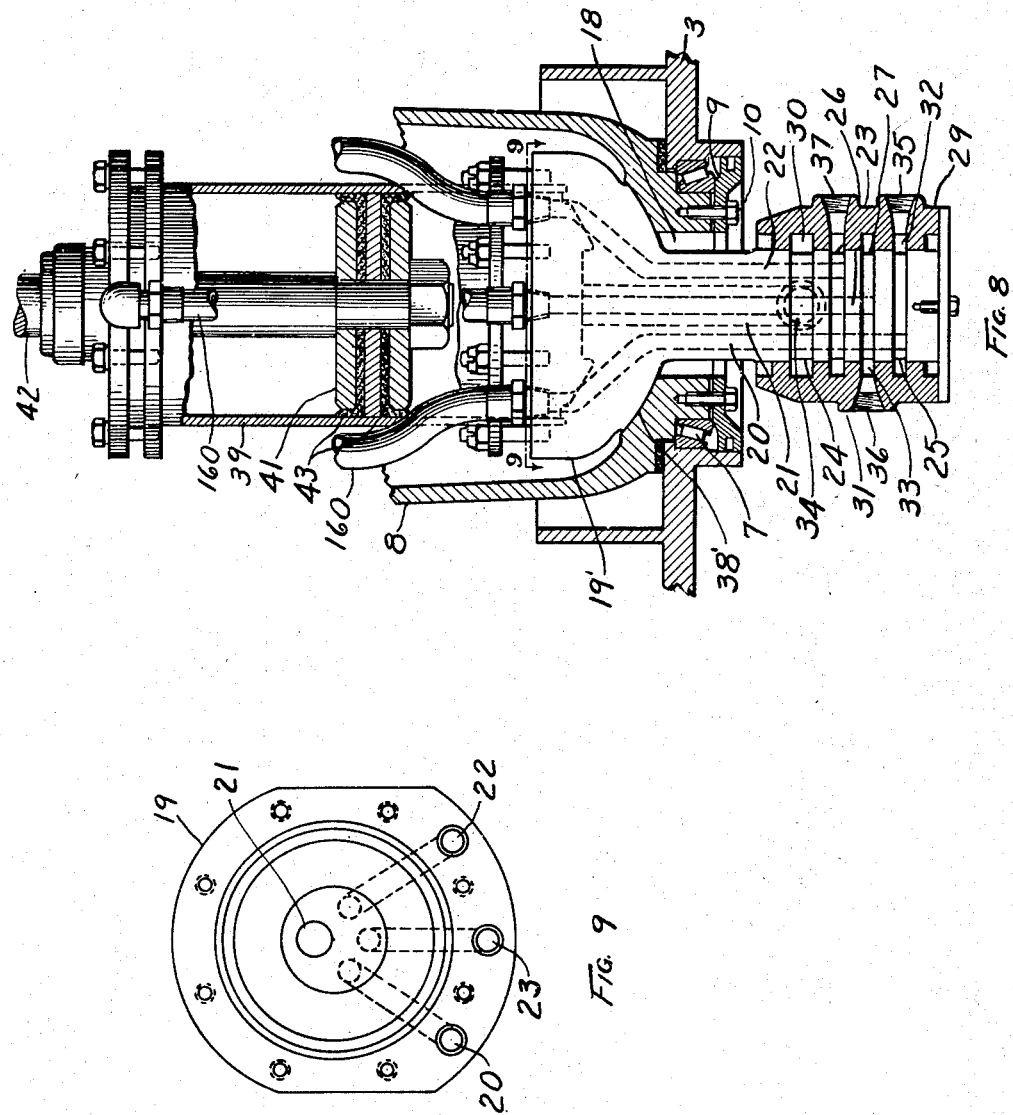

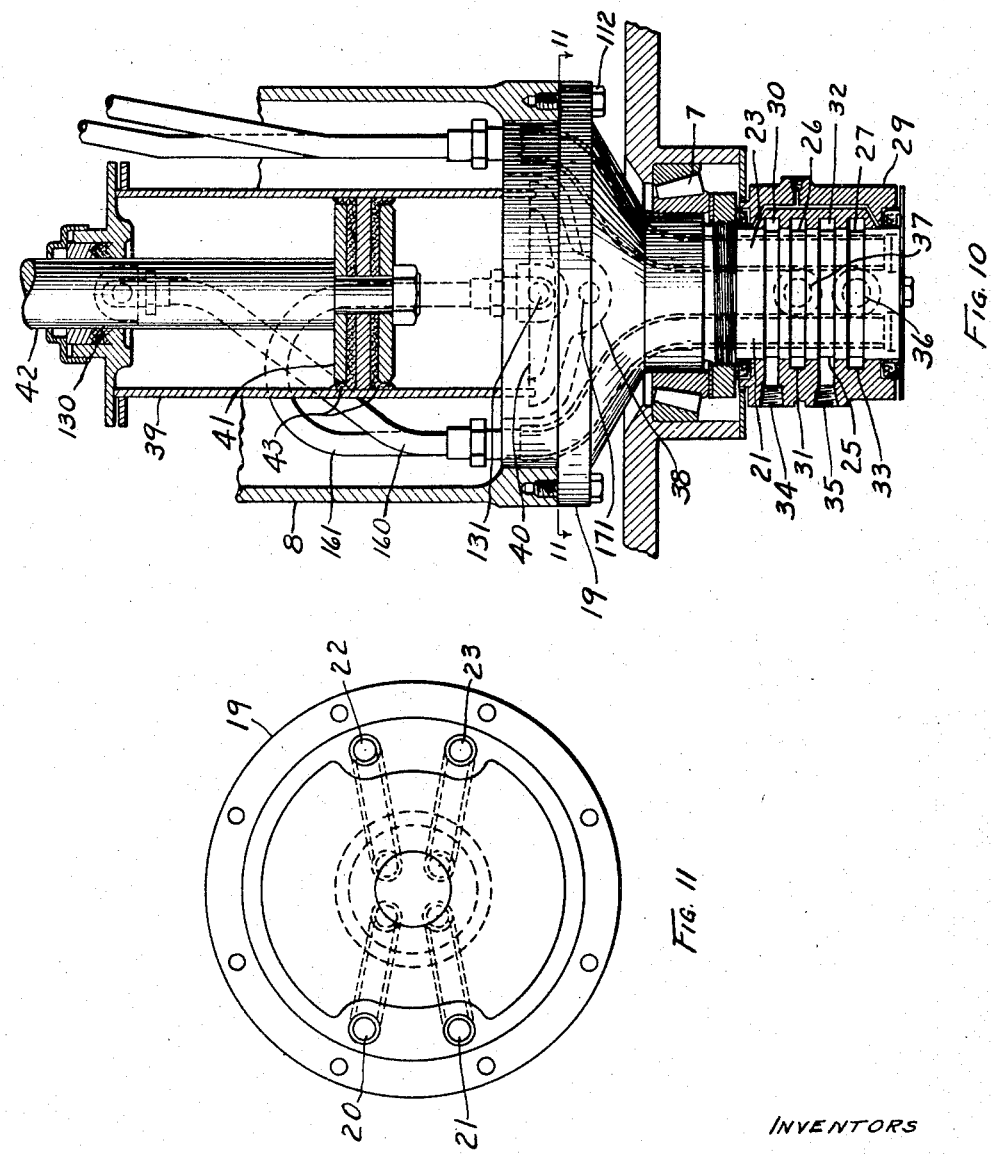

March 1, 1949. F. D. WILSON ET AL 2,462,926
FULL CIRCLE BOOM CRANE
Filed March 27, 1944 10 Sheets-Sheet 7
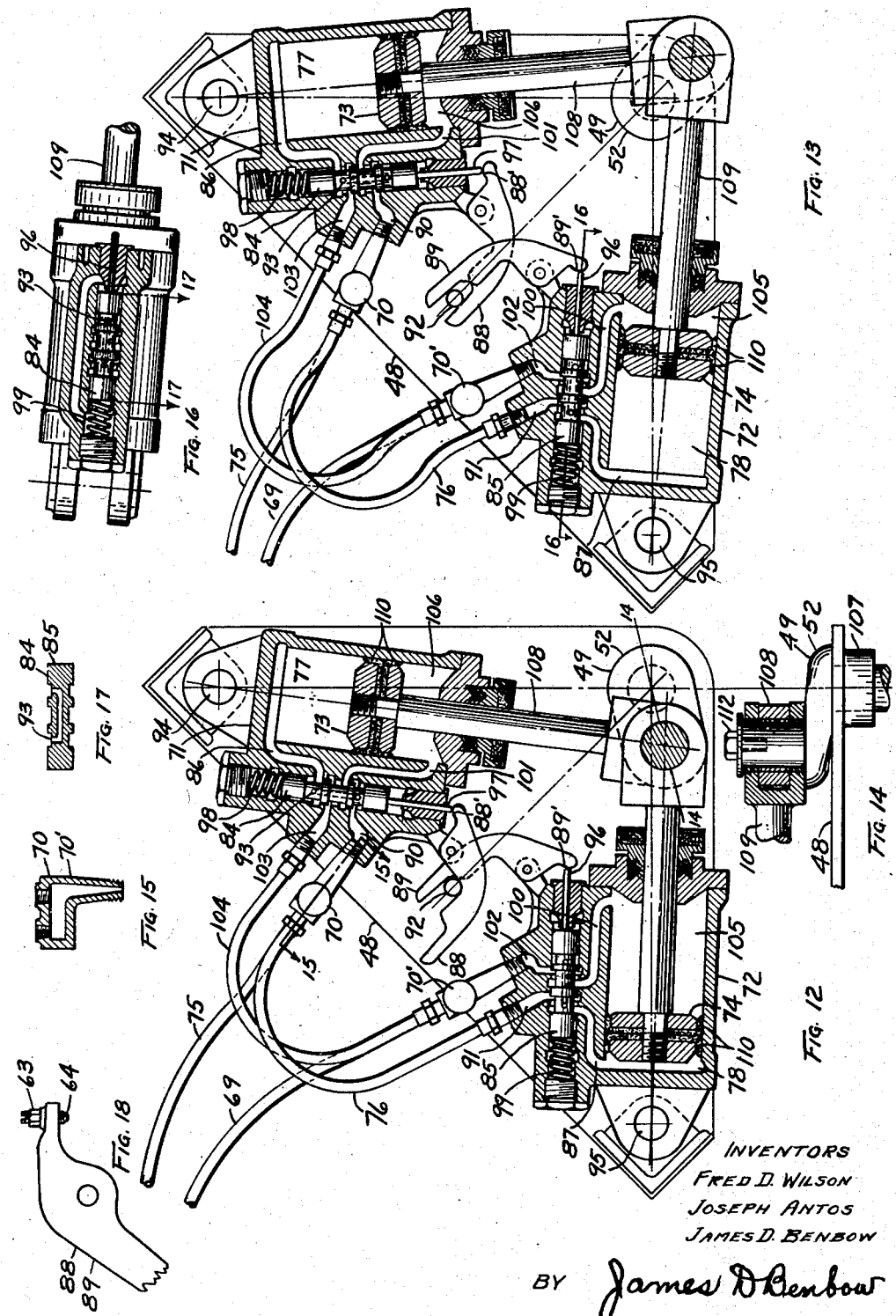
INVENTORS
FRED D. WILSON
JOSEPH ANTOS
JAMES D. BENBOW
BY James D Benbow
ATTORNEY

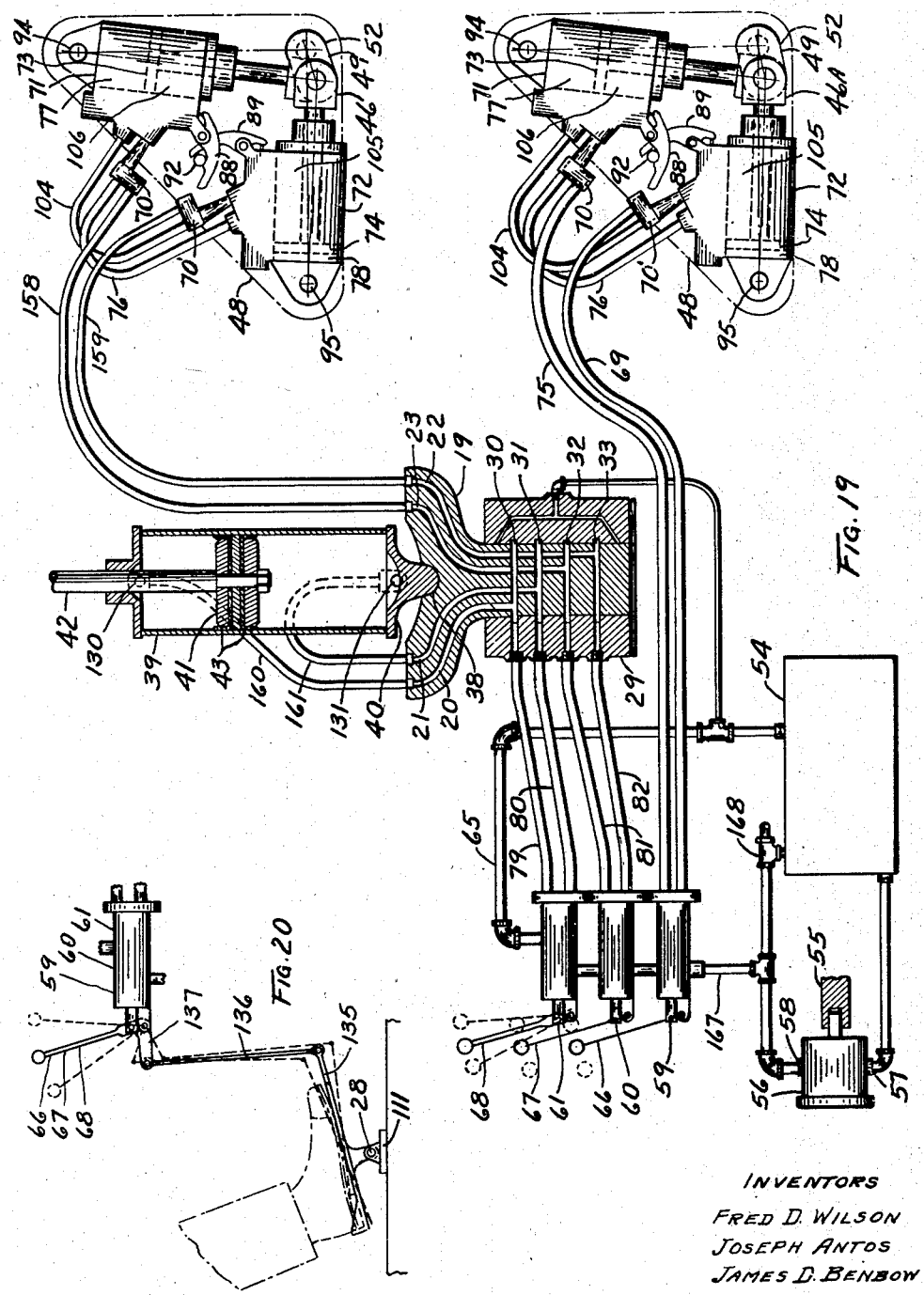

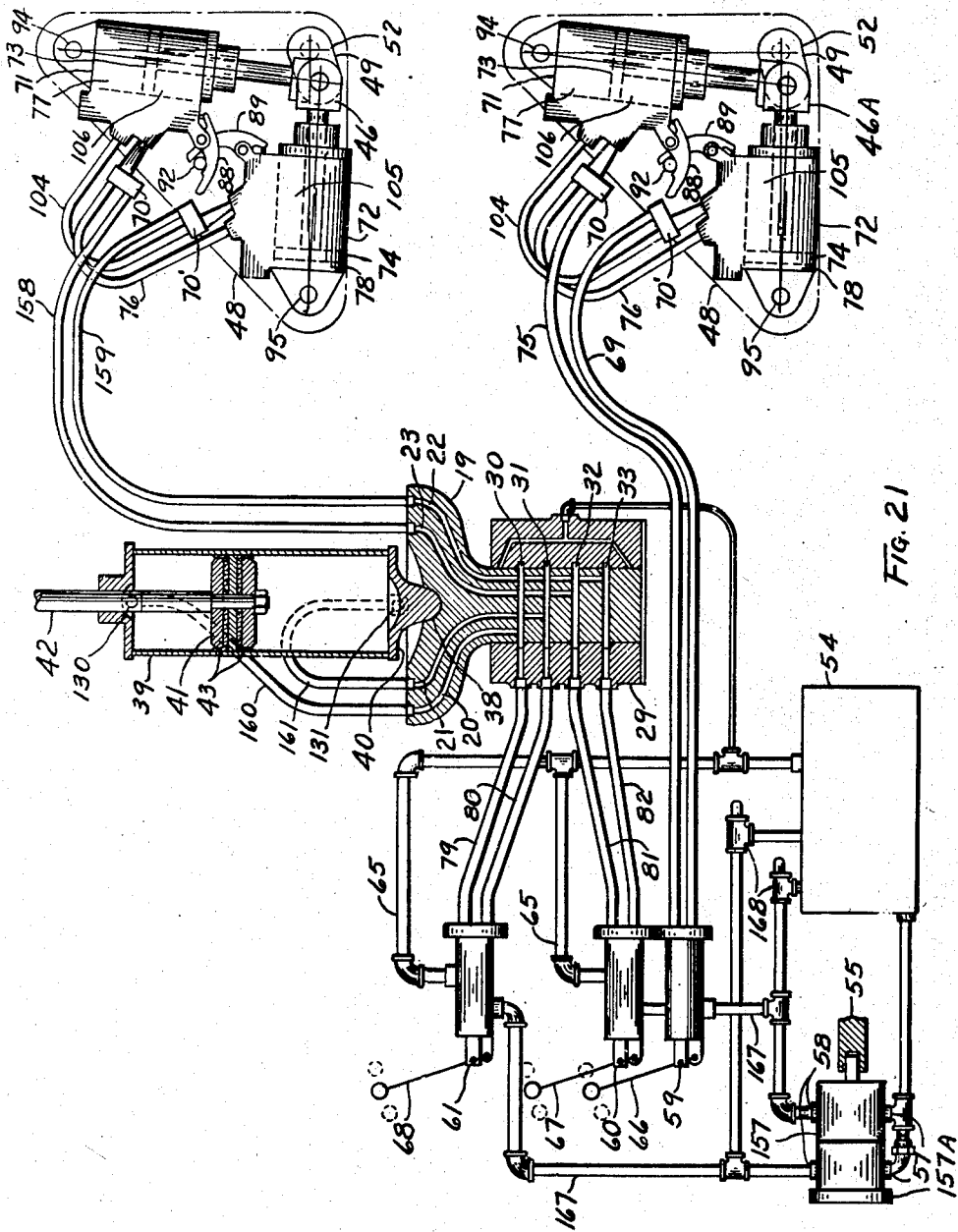

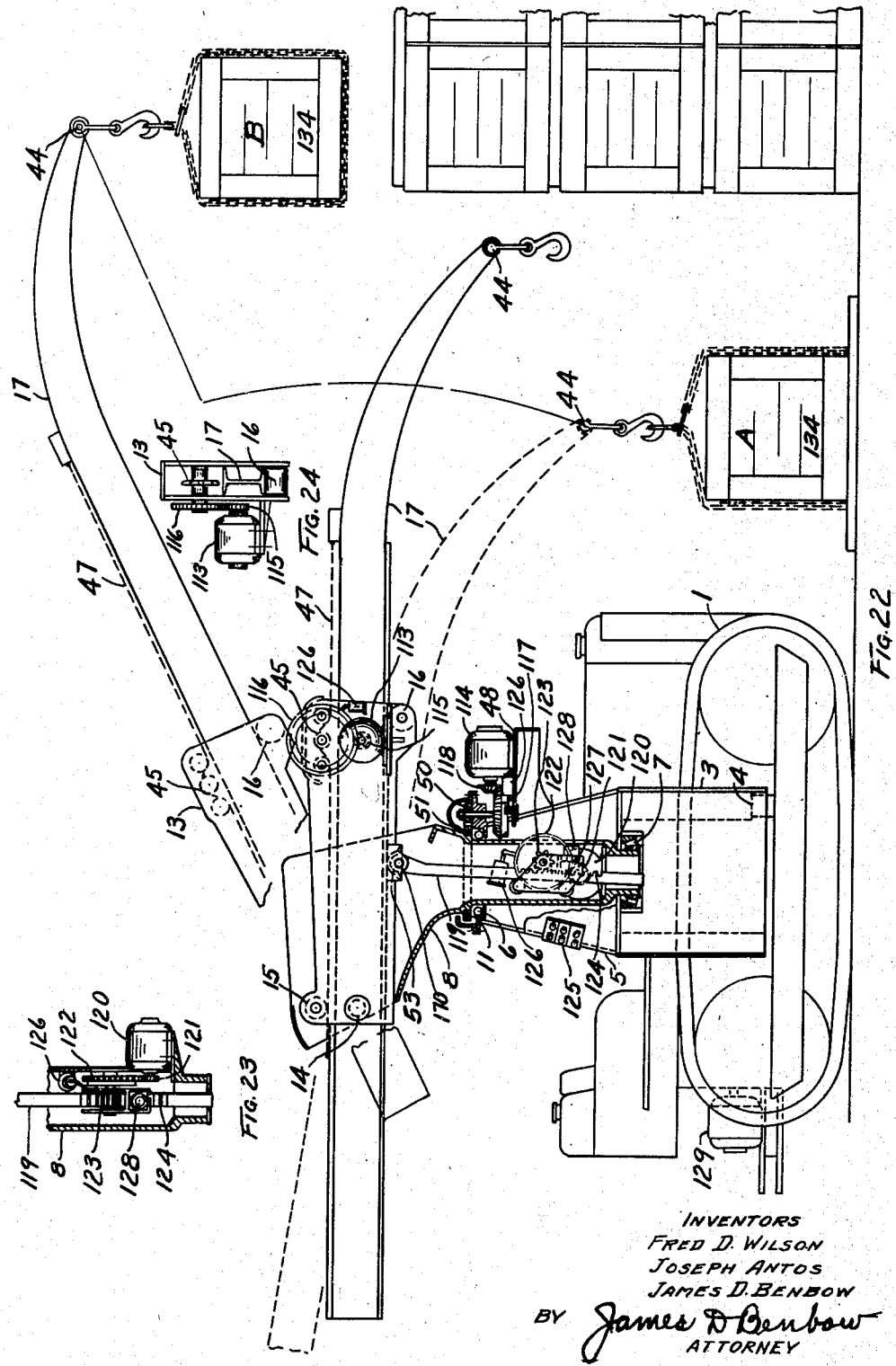

Patented Mar. 1, 1949

2,462,926

UNITED STATES PATENT OFFICE 2,462,926

FULL CIRCLE BOOM CRANE

Fred D. Wilson, Joseph Antos, and James D. Benbow, Aurora, Ill., assignors to Austin-Western Company, Aurora, Ill., a corporation of Illinois Application March 27, 1944, Serial No. 528,244

17 Claims. (Cl. 212—55)

This invention relates to improvements in full circle boom crane capable of being attached to various types of tractors and railroad cars as well as automotive trucks and any fixed or movable support.

One of the objects of our invention relates to a full circle boom crane having means to move the boom in and out, raise and lower, also to revolve the boom and load on its support in a complete circle or more or any portion of a circle and perform said operations all at one time or one operation at a time.

Another object of our invention is to perform all the above-mentioned operations by hydraulic power.

Another object of our invention is to rotate and move the boom in and out by the use of a special designed hydraulic or air propelled engine.

Another object of this invention is to provide a full circle boom crane mounted at any desirable place and derive said power from a stationary power plant to propel an air or hydraulic pump, or use electric current, whichever power is available.

Another object of this invention is to use electric power instead of the hydraulic or air means and by attaching a dynamo or electric generator to the power take-off of the tractor or truck and thus produce the electric current or use electric power supplied from an outside source. A motor with a solenoid brake is mounted on the side of the boom support to move the boom in and out and another similar motor mounted on the turntable support or frame to rotate the boom in a circle and a third similar motor attached to the turntable to raise and lower the boom support and the boom.

Another object of this invention is to provide a non-rotatable valve sleeve which permits the flow of oil or air from the control valve at the operator's station to the rotatable portion of the valve which may be a part of the turntable or the cylinder or jack support, permitting the boom turntable to make a complete circle and can continue in the same or a reverse direction and thus eliminate the tangling of hose or pipe.

Another object of this invention is to provide a device by means of which the slide valves of a plurality of oscillating reciprocating cylinders may be simultaneously regulated so as to admit a predetermined amount of steam, oil or air or other fluid to produce a rotating motion for the purpose shown and described in the description that follows. The slide valves are controlled by a single vertical projection mounted on the same surface as the reciprocating engines.

The boom can be moved inwardly by the power means until the lifting end of the boom is at the edge of the tractor or truck and then attach the object to be moved to the boom and be raised to the desired height and if necessary the boom can be moved outwardly or inwardly at the same time by power means so that the object to be moved can be loaded into a railway car or any other high position. If necessary to rotate the boom during the operation, this can be done by power means. In other words, the three different movements can be accomplished at the same time if desired, as well as moving truck or tractor if it is desired to deposit the object to be moved at some distant position away from the original position.

The boom can be used to pick up an object close by the crane and tractor or truck and can be raised to position almost vertical and at the same time extend the boom outward.

The full circle boom crane can be mounted on a railway hand car which has a power means to propel and produce electric current or to pump air or oil as described, thus permitting the full circle boom crane to be moved over the railroad to any desired point.

There are many attachments that can be applied to this full circle boom crane which will enhance the use of the same.

With the foregoing objects outlined and with other objects in view which will appear as the description proceeds, the invention consists in the novel features hereinafter described in detail, illustrated in the accompanying drawings and pointed out in the appended claims.

Fig. 1 is a side elevation of the crane mounted on a crawler type tractor with the boom in a low, high and horizontal position, also a partial cross section taken at the center of the boom support.

Fig. 2 is a side view of the hydraulic or air engine which moves the boom in and out.

Fig. 3 is an end view of the crane mounted on a crawler tractor and a dotted view of the boom at right angles to the tractor and boom support.

Fig. 4 is a plan view of the crane and a dotted position of the boom rotated in two positions.

Fig. 5 is an enlarged cross sectional view of the lower portion of the rotatable boom support of Fig. 1 showing the distributing valve.

Fig. 6 is a cross section of Fig. 5 taken at 6—6.

Fig. 7 is a plan view of Fig. 5 taken at 7—7.

Fig. 8 is a cross section of the rotatable boom support showing another form of construction of Fig. 5.

Fig. 9 is a plan view of Fig. 8 taken at 9—9.

Fig. 10 is a cross section of the rotatable boom support showing still another form of construction of Fig. 5.

Fig. 11 is a plan view of Fig. 10 taken at 11—11 with the outer casing removed.

Fig. 12 is a cross section of the hydraulic or air engine in one position.

Fig. 13 is a cross section of the hydraulic or air engine in another position.

Fig. 14 is a cross section taken at 14—14, Fig. 12.

Fig. 15 is a cross section of a junction fitting of Fig. 12 taken at 15—15.

Fig. 16 is a plan view and a cross section of directional control valve taken at 16—16, Fig. 13.

Fig. 17 is a cross section of the valve core taken at 17—17 of Fig. 16.

Fig. 18 is a broken side view of cam with adjustable cam face.

Fig. 19 is a diagrammatic view of the piping showing the method of control of the air or oil.

Fig. 20 shows the foot operating mechanism.

Fig. 21 is a diagrammatic view of the piping of the tandem pump.

Fig. 22 is a side elevation of the crane with electric motors.

Fig. 23 is a sectional view of the lifting mechanism.

Fig. 24 is an end view of boom shifting mechanism.

Description

Referring to the drawings Figs. 1, 2, 3 and 4, we have shown a crawler tractor 1 having an arched support or frame 3 attached to each side of the crawler wheel support 2 and to crawler cross tie 4 inside of each crawler.

The upper portion 5 of the arch support or frame 3 is conical shaped, having roller or ball bearings mounted at 6 and 7 to support the turntable 8 for rotation.

The turntable 8 projects downwardly through the arch support 5 and 3 at 6 and 7 (see Figs. 1 and 5) and has a washer plate or retaining ring 9 fastened to 8 by cap screws 10 to prevent upward movement of turntable 8 which is also a retainer for bearing 7.

At the upper end of the turntable support 5 is a ball bearing race 11 which supports the turntable 8 when lifting a load or during the rotation thereof.

The upper end of turntable 8 has an opening 12 (see Figs. 3 and 4) rectangular in shape and mounted therein is a boom support 13 which oscillates about the pivot 14.

The boom support 13 has rollers 15 and 16 mounted therein to support the boom 17 for inward and outward movement.

Referring to Fig. 5, at the lower end of the turntable 8 and projecting through the opening 18 is jack or cylinder support 19, the lower end of which is a rotatable valve core circular in form, which rotates with the turntable 8, and has four openings 20, 21, 22, 23 extending downwardly to grooves 24, 25, 26 and 27 which are concentric with the jack or cylinder support 19. Surrounding the grooves is a non-rotating circular valve sleeve 29 having circular grooves 30, 31, 32 and 33 which match and coincide with the grooves 24, 25, 26 and 27 in the lower end of jack support 19.

On the outside of the non-rotating circular valve sleeve 29 are drilled and tapped holes 34, 35, 36 and 37 which enter the grooves 30, 31, 32 and 33.

(See Figs. 5 and 10.) On the upper end of the jack or cylinder support 19 is a ball-shaped depression 38 which supports the lower end 40 of the hydraulic or air jack or cylinder 39 and permits the jack or cylinder 39 to oscillate during the movement of the piston 41 and piston rod 42. Piston 41 has two packing cups 43 which are placed in opposite positions to permit pressure to be exerted on either side of the piston 41.

The upper end of piston rod 42 contacts the lower side of the boom support 13 at 53 (Fig. 1) and thus the boom 17 and boom support 13 can be moved up and down about the pivot 14, thus raising and lowering the boom 17 and the load which is attached to the end of the boom 17 at 44.

Figs. 8 and 9 illustrate a variation in the design of the jack or cylinder support 19 shown in Fig. 5. In Fig. 8 the jack or cylinder 39 is attached to and becomes a part of the jack or cylinder support 19, thus doing away with the cylinder head 40. The opening 18 of the turntable 8 is enlarged to permit the jack or cylinder support 19' and the cylinder or jack 39 to oscillate in the ball-shaped surface at 38'. In Fig. 9 the opening 21 is located at the center of the cylinder or jack support 19'. The rotatable valve is the same as described.

Figs. 10 and 11 illustrate another variation in the design of the cylinder or jack support 19. The turntable 8 and the lower portion thereof extends through the opening 7 and is the rotatable valve. The upper portion of turntable 8 and the lower portion are connected by means of studs 112. Otherwise the operation is the same as described for Figs. 5 and 7.

Referring to Figs. 1, 2, 12, 13, 14, 15 and 16, on the side of the boom support 13 is mounted an air or oil dual reciprocating engine 46 which has a pinion or sprocket 45 mounted on crank shaft 52 inside of the boom support 13 and contacts or engages sprocket chain or rack 47 which is attached to the top of boom 17 and with the reciprocating movement of the dual engine 46, the boom 17 is moved inward or outward as desired.

Attached to the outside of turntable support 5 is a support plate 48 on which is mounted a dual reciprocating engine 46A which is similar to the one shown in Figs. 2, 12, 13, 14, 15 and 16 and connected to the crank shaft 49 is a pinion 50 which engages circular gear 51 mounted on turntable 8. By the reciprocating motion of the dual engine 46A the turntable 8 can be rotated in a full circle or more, or any portion of a circle.

Referring to Fig. 19 which is a diagrammatic view of the hydraulic or air control mechanism to control the raising, lowering, moving inward or outward and rotating of the boom 17 and the load. Mounted on the tractor 1 is a tank 54 and attached to the power take-off 55 of the tractor 1 is a pump 56 having an inlet 57 and an outlet 58 leading to the control valves 59, 60 and 61 through inlet pipe 167. If pipes or valves become clogged so that the oil or air cannot get through it will be forced back into tank 54 through safety valve 168 which has been set at a predetermined pressure. Control valve 61 controls the raising and lowering of the piston 41, piston rod 42, boom support 13 and boom 17. Control valve 60 controls the direction of movement of the dual reciprocating engine 46 and the inward and outward movement of boom 17.

Control valve 59 controls the direction of movement of the dual reciprocating engine 46A and the rotation of turntable 8, boom support 13, and boom 17. Each of the valves 59, 60 and 61 have three positions; neutral, forward and backward.

Control valve 61 when in a neutral position will hold the pressure on each side of the piston 41 of hydraulic or air jack or cylinder 39, thus causing the piston 41 to remain stationary in whatever position the piston is in when control valve 61 is moved to the neutral position and thus controlling the up and down position of the boom 17 when lifting a load and swinging same to the unloading position.

By moving valve lever 68 of valve 61 toward you from the neutral position, the oil or air pressure from pump 56 will be forced through outlet 58 into inlet pipe 167, through valves 59 and 60 into valve 61, thence into pipe or hose 80 into circular groove 31 of 29 to opening 20 of 19 into hose or pipe 161 to opening 131, thence into hydraulic or air jack 39 below the piston 41 which will be forced upward raising the boom support 13 and boom 17, through the piston rod 42 which contacts the boom support 13 at 53 (Fig. 1). As the piston 41 rises the oil or air on the upper side will be forced through opening 130 into pipe or hose 160, into opening 20 of 19 to circular groove 30 of 29, to pipe or hose 79, back into valve 61, thence into return pipe 65 and into tank 54. If valve lever 68 is moved forward from the neutral position, the pressure would be above the piston 41 and the oil or air below it would be forced back into the tank through the connecting passages.

Control valve 60 when in neutral position will hold the boom 17 in whatever position, inward or outwardly, it was when valve 60 was moved to neutral position, thus holding the load on the boom 17 in a fixed position in relation to the center of rotation when it is desired to rotate turntable 8, boom support 13 and boom 17 to deposit the load carried by the boom 17.

Control valve 59 when moved to the neutral position will stop and hold the turntable 8, boom support 13 and boom 17 and its load in any desired position of the horizontal plane or circular arc.

Thus is seen that the use of a moving cable or other flexible means is eliminated as we control the lifting and lowering of the load by control valve 61 which permits fluid pressure to move the piston 41 and piston rod 42 up or down, in combination with control valve 60 which controls the moving in and out of the boom 17 in boom support 13, thus the end of the boom 17 can be close to the tractor and by operating control valve 61 raise the boom and load, and by operating control valve 60 move the boom 17 outward during the up or down movement, thus increasing the distance that the load can be raised or lowered.

Referring to Fig. 19, when control valves 59, 60 and 61 are in neutral position and pump 56 is in operation, the oil in tank 54 is drawn into pump 56 through inlet 57 and is forced out of outlet 58 under pressure into inlet pipe 167 and into control valve 59 on through control valves 60 and 61 and then returned to tank 54 through return pipe 65, thus making a complete circuit.

Fig. 20 is a foot operating mechanism by which the control valves 59, 60 and 61 can be operated by the foot as well as the hand. Foot lever bracket 111 supports the foot operating lever 135 through pivot pin 28. Foot operating lever 135 is connected to special valve lever 137 which is an extension of regular control valve levers 66, 67 and 68 by foot lever connection 136. Thus it will be seen that when toe pressure is applied to foot operating lever 135, the control levers 66, 67 and 68 will be moved outward and when heel pressure is applied, control levers 66, 67 and 68 will be moved inward.

When any one of control valve levers 66, 67 or 68 are pushed forward or pulled backward from neutral position the flow of oil is changed. If valve control lever 67 is pushed forward, the oil pressure from pump 56 through outlet 58 will be forced into inlet pipe 167 and through control valve 59 into control valve 60, thence through pipe 81 into groove 32 of 29 to opening 23 of 19 and into hose 158 which becomes the pressure line and leads to dual reciprocating engine 46. Hose 158 connects to junction fitting 70 which directs the oil into power chamber 77 of cylinder 71, also through hose connection 76 to power chamber 78 in cylinder 72. Thus the crank shaft 49 will be rotated counter-clockwise and as pistons 73 and 74 are moved by the oil pressure, the oil in chambers 105 and 106 is forced into junction fitting 70′, thence into return pipe 159 through opening 22 of 19 into groove 33 of 29, thence into hose 82 to control valve 60 on through control valve 61 to pipe 65 and return to tank 54.

If control valve lever 67 is pulled back instead of pushed forward, the dual reciprocating engine 46 would reverse its direction and run clockwise, pipe 159 would become the pressure pipe, and pipe 158 would become the return pipe. The above description is true of control valve 59 except that the oil pressure from control valve 59 does not have to pass through circular valve sleeve 29. Control valve 59 controls the operation of dual reciprocating engine 46A and as this engine does not have to rotate with the turntable 8, boom support 13 and boom 17, it is connected direct from valve to engine by pipes or hoses 69 and 75. Thus it will be seen that when the valve levers are pushed forward it delivers oil pressure to a certain side of the pistons in the various power units and when the levers are pulled back the pressure is directed to the opposite side of the pistons thus reversing the direction of motion and when levers are in neutral position, the oil is free to flow through the valves only and return to the oil tank 54.

Fig. 21 is a diagrammatic view of the hydraulic or air control mechanism similar to that shown in Fig. 19 and operates in exactly the same manner except that it has a tandem pump 157 and 157A. It will be seen that the two dual reciprocating engines 46 and 46A are controlled by control valves 59 and 60 which are connected to pump 157 and that the hydraulic or air jack 39 is controlled by control valve 61 which is connected to pump 157A. This arrangement allows much faster action of the hydraulic or air jack 39 which raises and lowers boom support 13 and boom 17 as the restriction of the oil or air passing through control valves 50 and 60 and the reciprocating dual engines is eliminated and the full capacity of one pump is available for the operation of the hydraulic or air jack 39.

It will be noted that control valves 60 and 61 are connected by pipes or hoses 79, 80, 81 and 82 to circular valve sleeve 29 as shown in more detail. Figs. 5, 6, 7, 8, 9, 10 and 11. From the pipe or hose connections 79, 80, 81 and 82, the oil is forced into circular grooves 30, 31, 32 and 33, which circular grooves are connected to the openings 20, 21, 22 and 23 in rotatable valve at lower end of jack support 19 from which the oil can be piped to the hydraulic or air jack 39 and the dual reciprocating engine 46, Figs. 19 and 21. This construction allows the turntable 8, hydraulic or air jack 39 and jack support 19 to rotate in a complete circle, as the contact surfaces between circular valve sleeve 29 and rotatable valve at lower end of jack support 19 are ground to an oil tight fit. Circular valve sleeve 29 is prevented from rotating by lug 83, Fig. 6, which is anchored to arch support 3.

To show the action of the cams 88 and 89 and the valve cores 84 and 85, also the flow of oil or air through the dual reciprocating engine 46 or 46A we refer to Figs. 12, 13, 14, 15, 16, 17 and 18. The valve cores 84 and 85 are moved to their various positions through the action of cams 88 and 89 by their rocking motion as they slide on the cam pin 92, which sliding action is due to the backward and forward motion of the cylinders as they oscillate about their pivots 94 and 95 as the crank shaft 49 or 52 is rotated.

Cam pins 92 and pivots 94 and 95 are fastened in fixed relation to each other to a support plate 48 which can be made to any shape desired.

The valve cores contact the cam faces 88 and 89 through core pins 96 and 97 which are held in contact by the pressure of the springs 98 and 99 which tend to force the valve cores and core pins against the cam faces. Thus it will be seen that the cams move the valve cores in one direction and the springs move them in the opposite direction and it will also be seen that as the valve cores are moved from one position to another the oil or air will be directed thru the different passageways and chambers as shown in Figs. 12 and 13.

Fig. 18 is another form of cam 88 and 89 with an adjustable cam face 64 which can be screwed in or out to the proper adjustment with core pins 96 and 97 and locked in position by lock nut 63.

In Fig. 12 with pipe line 75 as the pressure line, it will be seen that the oil or air is forced into junction fitting 70 and from there into chamber 90, also through hose connection 76 into chamber 91, thence into passageway 87 and into power chamber 78 in cylinder 72, and from chamber 90 the oil or air pressure continues on through passageway 93, (see Fig. 17) thence into passageway 86 and into power chamber 77 cylinder 71. Thus it will be seen that with pressure in chambers 77 and 78, the crank shaft 49 or 52 will be rotated counter-clockwise.

As the pistons 73 and 74 are moved forward, the oil or air in chambers 105 and 106 is forced back into supply tank. The oil or air from chamber 105 cylinder 72 is forced through passageway 100 in chamber 102, then into junction fitting 70', and the oil or air from chamber 106 cylinder 71 is forced into passageway 101, thence into chamber 103 to hose connection 104 and into junction fitting 70'. From junction fitting 70' the oil is forced into return pipe 69 and back to supply tank through operating valves.

In Fig. 13 it will be noted that valve core 84 is in a different position than the same valve core shown in Fig. 12. In the position shown in Fig. 13 it will be seen that with pipe line 75 as the pressure line the flow is into junction fitting 70, thence into chamber 90, into passageway 101, on into power chamber 106 which is on the piston rod side of the piston 73, thus the continued counter-clockwise rotation of the crank shaft, chamber 78 in cylinder 72 is still the power chamber until cam 89 changes the position of valve core 85.

The oil return from chamber 77 Fig. 13 is into passageway 86 to chamber 103, thence into hose connection 104 to junction fitting 70' into return pipe 69. The return from chamber 105 is the same as described before.

Fig. 3 is a front view of the crane on which are shown auxiliary braces 132 and 133 which can be used if desired. These braces are adjustable as to length so that they will set firmly on the ground to keep the crane from tipping when a heavy load is held in position as shown by dotted line. These braces are easily lifted up out of the way for moving.

In Fig. 22 we show the application of electric motors to the full circle boom crane. The power is derived from the dynamo or generator 129 which is attached to the power take-off of the tractor 1.

The full circle boom crane has mounted thereon electric motors 113, 114 and 120 which can be rotated in either direction and are controlled by the push buttons 125. Each motor has a solenoid brake 126 which acts to brake and hold the motors in the desired position when the operator pushes the proper push button or switch. The rotating of turntable 8, boom 17 and boom support 13 is accomplished by motor 114 mounted on support plate 48 and has a bevel pinion 118 mounted on the motor shaft which engages bevel gear 117 which is mounted on the same vertical shaft as pinion 50 which engages circular gear 51 which is attached to turntable 8. The direction of rotation is controlled by the push button of the switch 125.

The raising and lowering of the boom 17 and boom support 13 is accomplished by the motor 120 which is mounted on turntable 8, having pinion 121 mounted on the motor shaft. Pinion 121 engages gear 122 which has pinion 123 mounted on the same shaft which in turn engages the rack on the boom raising and lowering bar 119.

Mounted just below the pinion 123 and in the same bracket is a lock rack 127 which engages and disengages rack on the boom raising and lowering bar 119 by means of a solenoid 128. Lock rack 127 engages the teeth on the boom raising and lowering bar 119 when the motor 120 is stopped, thus holding the boom at any position up or down. As soon as the button is pushed to start the motor 120, the solenoid 128 withdraws the lock rack 127 and the boom 17 can be raised or lowered.

The moving of the boom 17 in and out in the boom support 13 is accomplished by reversible motor 113 which is mounted on the boom support 13. The motor 113 has a pinion 115 mounted on its shaft, engaging gear 116 which has mounted on its shaft a sprocket or pinion 45 which contacts sprocket chain or rack 47 and moves the boom 17 inward or outward in relation to the center of rotation of the turntable 8. Where chain 47 is used there are two sprocket idlers, one on each side of the driven sprocket 45 to give the chain more contact with the driven sprocket 45.

In F.g. 22 we have shown the full circle boom crane being used to raise a crate 134 from position A to position B and ready to deposit the crate 134 on the pile of crates. To perform this operation it is first necessary to lower the boom 17 to the dotted position which requires the use of two motors 113 and 120, first to move boom 17 inward by rotation of motor 113 and lower the boom 17 and boom support 13 by rotation of motor 120.

To elevate the crate 134 to position B we first adjust the chain around the crate and attach hook to the chain, rotate motor 120 to raise the boom 17 and crate 134 to the desired height and rotate motor 113 to move the boom outward to the position shown by the upper solid lines and then lower boom support 13 and boom 17 and deposit the crate 134 on the top of the pile of crates shown.

The same operation can be performed by the use of a hydraulic full circle boom crane as shown in Fig. 1, etc.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

We claim:

1. A rotatable boom crane, in combination, a frame having conical shaped opening with upper and lower bearings mounted therein, a cone-shaped turntable supported for rotation by said upper and lower bearings on said frame, a boom support having a rectangular opening longitudinally thereof pivotly connected at one end to said turntable for up and down movement, a boom mounted in said boom support for inward and outward movement, power means mounted on said frame contacting said turntable to rotate said turntable in a full circle or any portion thereof, power means mounted on said boom support contacting said boom to move said boom inward or outward in said boom support, power means mounted in the conical shaped opening of said turntable and contacting the boom support to raise and lower said boom support and boom, control means mounted on said frame to control the said power means to raise, lower, move inward and outward, and rotate said turntable, boom support and boom in a full circle or any part of a circle.

2. A rotatable boom crane, in combination, a frame having upper and lower bearings mounted therein, a cone-shaped turntable having a rectangular opening at the top thereof supported for rotation on said upper and lower bearings and by said frame, a boom support pivotly connected to said turntable in the rectangular opening at one side of the center of rotation of said turntable for up and down movement, a boom having means for attaching various tools mounted in said boom support for inward and outward movement, power means mounted on said frame to rotate said turntable boom support and boom, power means mounted on said boom support to move said boom and said attachments inward or outward in said boom support, power means mounted in the conical opening of said turntable and connected to said turntable and boom support to raise, lower and exert a downward pull on said boom support, said boom and said attachments, control means mounted on said frame to control the combined power means to raise, lower, move inward and outward, and rotate said turntable, boom support, boom with said attachments in a full circle or any part of a circle.

3. A rotatable boom crane, in combination, a frame having upper and lower bearings mounted therein, a turntable supported for rotation by said upper and lower bearings on said frame, a boom support pivotly connected to said turntable for up and down movement, a boom mounted in said boom support for inward and outward movement, power means engaging said turntable mounted on said frame to rotate said turntable, power means mounted on and attached to said boom support engaging said boom to move said boom inward or outward in said boom support, power means mounted on said turntable and attached to the boom support to raise and lower said boom support and boom, control means mounted on said frame to control the combined power means to raise, lower, move inward and outward, and rotate said boom in a full circle or any part of a circle in either direction.

4. A rotatable boom crane, in combination, a frame having upper and lower bearings mounted therein, a turntable supported for rotation by said upper and lower bearings and said frame, a boom support having a horizontal rectangular opening pivotly connected to said turntable at one side of the center of rotation of said turntable for up and down movement, a boom mounted in said boom support for inward and outward movement, an hydraulic motor mounted on said frame to rotate said turntable, an hydraulic motor mounted on said boom support to move said boom inward or outward in said boom support, hydraulic cylinder having a piston rod mounted in said turntable and the piston rod contacting the boom support to raise and lower said boom support and boom, hydraulic control means mounted on said frame to control the hydraulic motors and piston rod to raise, lower, move inward and outward, and rotate said turntable, boom support and boom in a continuous circle movement, full circle or any part of a circle.

5. In a rotatable boom crane, in combination, a frame, turntable capable of rotating in a continuous circle or any portion of a circle mounted on said frame, a boom support pivotly mounted on said turntable for upward and downward movement, a boom mounted in said boom support for inward and outward movement, dual reciprocating engines mounted on said boom support and connected to said boom to move said boom inwardly and outwardly in said boom support from the center of rotation of said turntable, a hydraulic cylinder or jack pivotly mounted in said turntable and attached to the boom support to raise and exert a downward pull on one end of said boom support about said pivot to raise, lower and exert a downward pull on the said boom, a dual reciprocating engine mounted on said frame having rotatable connection with said turntable to rotate said turntable, boom support and boom about its center of rotation, means to control the movement of said hydraulic cylinder or jack and said dual reciprocating engines, to raise, lower, move inwardly or outwardly and exert a downward pull on the said boom, and to cause the boom and its component parts to make a complete cycle of operation to perform the work to be done.

6. In a rotatable full circle boom crane, in combination, a self-propelled vehicle, a frame mounted on said vehicle, a turntable capable of rotating in a full circle mounted on said frame, a boom support pivotly mounted on said turntable for upward and downward movement, a boom mounted in said boom support for inward and outward movement, dual reciprocating engines mounted on said boom support and rotatably connected to said boom to move said boom inwardly and outwardly in said boom support, a cylinder with a piston rod pivotly mounted in said turntable having said piston rod attached to said boom support to raise and lower one end of said boom support and said boom about said pivot, a dual reciprocating engine mounted on said frame having rotatable connection with said turntable to rotate said turntable, boom support and boom, said turntable having a downward projection cylindrical in shape which forms a valve core and having horizontal circular grooves with openings leading upwardly from each groove and tapped for pipe or hose connections to the cylinder and reciprocating engines, a non-rotatable valve sleeve mounted on said valve core having grooves to match those in said valve core and openings leading outward from each of said grooves tapped for pipe or flexible hose connections to control valve to permit the operator to control all the movements of said piston rod and said engines.

7. A rotatable boom crane, in combination, a frame having upper and lower bearings, said turntable having a downward projection cylindrical in shape extending below the bearings supported by said bearings on said frame, said downward projection having horizontal grooves and vertical openings from each groove forming a valve core, a non-rotatable valve sleeve mounted on said valve core having grooves to match those in the core and openings leading from each of said grooves for connections to control valves, a boom support pivotly mounted on said turntable and having a boom mounted therein with means on said boom support to move said boom inward and outward, means mounted on said turntable to raise and lower the said boom and boom support, means mounted on said frame to rotate said turntable, boom support and boom in a complete circle, the operator by the use of said control valves can control the raising, lowering of said boom support and boom and the inward and outward movement of said boom and the rotatable movement of said turntable, boom support and boom in a continuous circle or any portion of a circle.

8. In a rotatable boom crane, in combination, a crawler tractor, a frame mounted on said tractor, control valves mounted on said frame, a turntable capable of rotating in a continuous circle, full circle or any part of a circle, mounted on upper and lower bearings on said frame, a boom support pivotly mounted on one side of the center on said turntable for upward and downward movement, a boom mounted in said boom support for inward and outward movement, dual reciprocating engines mounted on said boom support and rotatably connected to said boom to move said boom inwardly and outwardly in said boom support, a cylinder having a piston and piston rod pivotly mounted in said turntable and said piston rod attached to said boom support to raise and lower one end of said boom support and said boom about said pivot, a dual reciprocating engine mounted on said frame having rotatable connection with said turntable to rotate said turntable, boom support and boom, said turntable having a downward projection extending below the lower bearing support the lower end of which is cylindrical in shape and forms a valve core and having horizontal circular grooves with openings leading upwardly from each groove and tapped for pipe or hose connections to the cylinder and reciprocating engines, a non-rotatable valve sleeve mounted on said valve core having grooves to match those in said valve core and openings leading outward from each of said grooves tapped for pipe or flexible hose connections to said control valve to permit the operator to control all the movements of said boom crane.

9. In a rotatable boom crane, in combination, a frame, control valves mounted on said frame, a turntable capable of rotating in a continuous circle, full circle or any part of a circle mounted on upper and lower bearings on said frame, a boom support pivotly mounted on said turntable for upward and downward movement, a boom mounted in said boom support for inward and outward movement, dual reciprocating engines mounted on said boom support and rotatably connected to said boom to move said boom inwardly and outwardly in said boom support, a cylinder having a piston rod mounted in said turntable under said boom support, having the piston rod attached to said boom support to raise and lower one end of said boom support and said boom about said pivot, a dual reciprocating engine mounted on said frame having rotatable connection with said turntable to rotate said turntable, boom support and boom, said turntable having a downward projection below the lower bearings the lower end of which is cylindrical in shape and forms a valve core and having horizontal circular grooves with openings leading upwardly from each groove and tapped for pipe or hose connections to the cylinder and reciprocating engines, a non-rotatable valve sleeve mounted on said valve core having grooves to match those in said valve core and openings leading outward from each of said grooves tapped for pipe or flexible hose connections to said control valves to permit the operator to control all the movements of said boom crane.

10. A rotatable boom crane, in combination, a frame having upper and lower bearings mounted therein, a conical shaped turntable having a rectangular shaped opening in the upper portion thereof mounted on said upper and lower bearings on said frame, a boom support mounted for up and down movement in the rectangular shaped opening of said turntable, a boom mounted in said boom support for inward and outward movement, power means mounted on said turntable and contacting the boom support to raise and lower said boom support and boom, power means mounted on said boom support to move said boom inward or outward in said boom support, power means mounted on said frame to rotate said turntable, control means mounted on said frame to control the combined power means to raise, lower, move inward and outward, and rotate said turntable, boom support and boom in a full circle or any part of a circle.

11. A full circle boom crane attachment for a crawler tractor, comprising a cone shaped frame having upper and lower bearings therein mounted on said tractor, an inverted cone shaped turntable having a longitudinal rectangular opening at the top thereof supported for rotation on said upper and lower bearings on said frame, a boom support having a horizontal rectangular opening pivotly connected to said turntable for up and down movement, a boom mounted in said opening of said boom support for inward and outward movement, means at one end of said boom for attaching earth working tools, power means mounted on said boom support to move said boom and said tools inwardly and outwardly in said boom support, power means mounted in said turntable and pivotly connected to said turntable and said boom support to raise and lower said boom support, said boom, and said tools, power means mounted on said frame and contacting said turntable to rotate said turntable, boom support, boom and said tools, in a continuous circle in either direction or in any portion of a circle, transmission means connected to said crawler tractor to furnish power to said power means, control means to control said power means and all the movements of said full circle boom crane and said tools.

12. A full circle boom crane attachment for a crawler tractor, comprising a cone shaped frame having upper and lower bearings therein mounted on said tractor, an inverted cone shaped turntable having a longitudinal rectangular opening at the top thereof supported for rotation on said upper and lower bearings on said frame, a boom support having a horizontal rectangular opening at the top thereof pivotly connected to said turntable for up and down movement, a boom mounted in said opening of said boom support for inward and outward movement, power means mounted on said boom support to move said boom inwardly and outwardly in said boom support, power means mounted in said turntable and pivotly connected to said turntable and said boom support to raise and lower said boom support and said boom, power means mounted on said frame and contacting said turntable to rotate said turntable, boom support and boom, in a continuous circle in either direction or in any portion of a circle, transmission means connected to said crawler tractor to furnish power to said power means, control means on said attachment to control said power means and all the movements of said full circle boom crane.

13. A self-propelled motor vehicle, in combination, an electric generator mounted on said vehicle and driven by said motor, a frame mounted on said vehicle, a turntable supported for circular rotation on said frame, a boom support pivotally mounted on said turntable, a jack mounted in said turntable and attached to said boom support and turntable, a boom mounted in said boom support for inward and outward movement, an electric motor having a solenoid brake mounted on said boom support to move said boom inward or outward, an electric motor having a solenoid brake mounted on said frame engaging said turntable to rotate said turntable in a continuous circle in either direction, an electric motor having a solenoid brake mounted inside of and on said turntable under said boom support engaging said jack to raise and lower said jack, boom support and boom, control means on said frame to control the rotation of each of said motors, one at a time or all at one time to perform the function desired.

14. A self-propelled motor vehicle, in combination, an electric generator mounted on said vehicle and driven by said motor, a conical shaped frame having upper and lower bearings therein mounted on said vehicle, a conical shaped turntable having a gear on the outside thereof supported for full circle rotation on said upper and lower bearings of said frame, a boom support pivotally mounted on said turntable for up and down movement, a jack with a gear rack having an up and down movement attached to and mounted in said turntable and attached to said boom support, a boom with a gear rack mounted in said boom support for inward and outward movement, an electric motor having a solenoid brake and gear mounted on said boom support and engaging said gear rack to move said boom inward or outward, an electric motor having solenoid brake and gear mounted on said frame engaging said turntable gear to rotate said turntable in a continuous circle or any part of a circle in either direction, an electric motor having solenoid brake and gear mounted on said turntable engaging said gear rack to raise and lower said jack, boom support and boom, control means on said frame to control the rotation of each of said motors in either direction, one at a time or all at one time.

15. A full circle rotatable boom crane, in combination, a frame, a turntable supported for rotation on said frame, a boom support pivotally connected to said turntable for up and down movement, a boom mounted in said boom support for inward and outward movement, earth digging and moving tools attached to said boom, means mounted on said boom support to move said boom and said tools inward or outward in said boom support, means mounted on said turntable and engaging the boom support to raise and lower said boom support, boom and said tools, means mounted on said frame engaging said turntable to rotate said turntable, boom support, boom and said tools, control means mounted on said frame to control the inward, outward, raising, lowering and rotating movements of said boom and said tools in a full circle or any portion of a circle and in either direction.

16. In a full circle rotatable boom crane as specified in claim 15, wherein said boom crane is mounted on a self-propelled vehicle to permit its movement to and from the place of operation.

17. In a full circle rotatable boom crane as specified in claim 15, wherein said boom crane is mounted on a wheeled vehicle to permit it being transported to and from the place of operation.

FRED D. WILSON.
JOSEPH ANTOS.
JAMES D. BENBOW.

REFERENCES CITED

The following references are of record in the file of this patent:

UNITED STATES PATENTS

| Number | Name | Date |
| --- | --- | --- |
| 781,439 | Marsh | Jan. 31, 1905 |
| 1,043,394 | Boehm | Nov. 5, 1912 |
| 1,160,938 | Mitchell et al. | Nov. 16, 1915 |
| 1,315,684 | Primrose et al. | Sept. 9, 1919 |
| 1,509,295 | Holcomb et al. | Sept. 23, 1924 |
| 1,545,664 | Kassebeer | July 14, 1925 |
| 1,861,194 | Sloane | May 31, 1932 |
| 1,917,053 | Nelson et al. | July 4, 1933 |
| 2,075,819 | Manly | Apr. 6, 1937 |
| 2,098,237 | Hailey | Nov. 9, 1937 |
| 2,192,033 | Dalton | Feb. 27, 1940 |
| 2,272,949 | Kidder | Feb. 10, 1942 |
| 2,346,900 | Black | Apr. 18, 1944 |
| 2,348,796 | Ferwerda et al. | May 16, 1944 |
| 2,353,655 | Day | July 18, 1944 |
| 2,362,220 | Shoemaker | Nov. 7, 1944 |
| 2,365,167 | Billings | Dec. 19, 1944 |
| 2,365,168 | Billings | Dec. 19, 1944 |
| 2,365,169 | Billings | Dec. 19, 1944 |
| 2,381,731 | Erdahl | Aug. 7, 1945 |

FOREIGN PATENTS

| Number | Country | Date |
| --- | --- | --- |
| 391,777 | Great Britain | Apr. 26, 1933 |
| 139,976 | Switzerland | Aug. 16, 1930 |